US011602706B2

(12) United States Patent
Newton et al.

(10) Patent No.: US 11,602,706 B2
(45) Date of Patent: Mar. 14, 2023

(54) FILTER WITH INNER CONTAINER ARRANGEMENT

(71) Applicant: Donaldson Company, Inc., Minneapolis, MN (US)

(72) Inventors: Christian L. Newton, Pendleton, IN (US); Jason A. Wells, Indianapolis, IN (US)

(73) Assignee: Donaldson Company, Inc., Minneapolis, MN (US)

( * ) Notice: Subject to any disclaimer, the term of this patent is extended or adjusted under 35 U.S.C. 154(b) by 166 days.

(21) Appl. No.: 17/253,532

(22) PCT Filed: Jun. 6, 2019

(86) PCT No.: PCT/US2019/035819
§ 371 (c)(1),
(2) Date: Dec. 17, 2020

(87) PCT Pub. No.: WO2019/245749
PCT Pub. Date: Dec. 26, 2019

(65) Prior Publication Data
US 2021/0129051 A1    May 6, 2021

Related U.S. Application Data

(60) Provisional application No. 62/687,959, filed on Jun. 21, 2018.

(51) Int. Cl.
*B01D 29/96* (2006.01)
*B01D 35/30* (2006.01)

(52) U.S. Cl.
CPC ............. *B01D 29/96* (2013.01); *B01D 35/30* (2013.01); *B01D 2201/291* (2013.01);
(Continued)

(58) Field of Classification Search
CPC .. B01D 29/96; B01D 35/30; B01D 2201/291; B01D 2201/302; B01D 2201/307;
(Continued)

(56) References Cited

U.S. PATENT DOCUMENTS 2,201,418 A    5/1940   Williams et al.
3,262,572 A    7/1966   Cook
(Continued)

FOREIGN PATENT DOCUMENTS

EP       1949949 A1     7/2008
WO    2011/126136 A1   10/2011

OTHER PUBLICATIONS

International Search Report and Written Opinion for PCT/US2019/035819, dated Aug. 27, 2019.

*Primary Examiner* — Madeline Gonzalez
(74) *Attorney, Agent, or Firm* — Merchant & Gould P.C.

(57) ABSTRACT

A removable filter assembly for filtering a fluid having a particulate or a contaminant and configured to engage a filter housing having a center post. The removable filter assembly includes a filter element adapted to remove at least one of the particulate or contaminate from the fluid, wherein the filter element includes an interior wall defining a passage having a first end and a second end. A container arrangement includes a channel and an outer wall in contact with the filter element at the first end of the passage, wherein the outer wall defines an outer profile extending from the first end of the passage toward the second end of the passage. The channel defines an inner wall configured to provide a relatively fluid tight seal with the center post. The container arrangement is adapted to capture at least one of the particulate or contaminate from the fluid. The outer wall of the container arrangement can include a plurality of radially aligned ribs.

7 Claims, 3 Drawing Sheets

(52) U.S. Cl.
CPC .. *B01D 2201/302* (2013.01); *B01D 2201/307* (2013.01); *B01D 2201/34* (2013.01)

(58) Field of Classification Search
CPC .... B01D 2201/34; B01D 29/23; B01D 29/90; B01D 29/902
USPC ........ 210/232, 282, 440–443, 453–455, 457, 210/437, 450, 315, 338, 342
See application file for complete search history.

(56) References Cited

U.S. PATENT DOCUMENTS

| | | | |
|---|---|---|---|
| 5,560,820 A | 10/1996 | Consolo | |
| 7,543,711 B1* | 6/2009 | Stamey, Jr. | ........... B01D 35/147 |
| | | | 210/457 |
| 2015/0096931 A1* | 4/2015 | Jensen | .................. F02M 37/32 |
| | | | 210/457 |
| 2017/0087485 A1* | 3/2017 | Nyzen | .................. B01D 29/902 |

* cited by examiner

FILTER WITH INNER CONTAINER ARRANGEMENT

This application is a US National Stage application of PCT International Patent application No. PCT/US2019/035819, filed Jun. 6, 2019, which claims the benefit of priority to U.S. Provisional patent application Ser. No. 62/687,959, filed Jun. 21, 2018, which applications are incorporated herein by reference. To the extent appropriate, a claim of priority is made to each of the above disclosed applications.

TECHNICAL FIELD

The present disclosure relates to a fluid filter, and more particularly to a replaceable fluid filter having an inner container arrangement to reduce filter contamination from residuals or contaminants.

BACKGROUND

Filter systems are often used to remove a wide range of materials and items, such as contaminants, particulate matter, and residuals, among other matters, from a variety of types of fluids. For example, one type of filter system includes a filter assembly having a filter element that removes particulate and contamination from a hydraulic oil system. Another type of filter element, for example, may be structured to remove hydrocarbons or other contamination from a gas stream, including, but not limited to, an at least partially dry inlet or exhaust gas stream.

Certain filter assemblies may utilize removable, and/or replaceable, filter elements. Such filter assemblies may be structured to accommodate the removal of the existing filter element so that the removed filter element may be cleaned and/or replaced by another replacement filter element. The ability to remove and/or replace a filter element often includes removing the filter element through an opening or inlet of a filter housing of the filter system that houses the filter element. Yet, reinstallation of the filter assembly to the filter housing typically requires that the opening or inlet of the filter housing through which the filter assembly is removed is sealed in a manner that prevents and/or minimizes, during operation, fluid from passing through that opening in a manner that would allow the fluid to bypass the filter element.

Once the filter element has accumulated a sufficient quantity of residuals, the filter element is removed for cleaning or disposal. During removal of the filter element from the filter housing, particular care must be used to insure that no residuals remain in the filter housing; otherwise the filter housing becomes contaminated with the residuals, which can lead to contamination of filtered fluid. What is needed, therefore, is a filter element which reduces or eliminates residuals that can remain in the filter housing when a filter element is changed.

SUMMARY

This disclosure is directed to a replaceable filter cartridge for a filter assembly configured to filter a fluid, such as oil. The replaceable filter cartridge is configured to capture contaminants found in the oil and to remove the contaminants from the housing during removal of the cartridge from the assembly.

In one embodiment, there is provided a removable filter assembly for filtering a fluid having a particulate or a contaminant and configured to engage a filter housing having a center post. The removable filter assembly includes a filter element adapted to remove at least one of the particulate or contaminate from the fluid, wherein the filter element includes an interior wall defining a passage having a first end and a second end. A container arrangement, including a channel and an outer wall, are in contact with the filter element at the first end of the passage, wherein the outer wall of the container arrangement defines an outer profile extending from the first end of the passage toward the second end of the passage. The channel defines an inner wall configured to provide a relatively fluid tight seal with the center post. The container arrangement is adapted to capture at least one of the particulate or contaminate from the fluid. The outer wall of the container arrangement can include a plurality of radially aligned ribs

DETAILED DESCRIPTION

Figure 1:
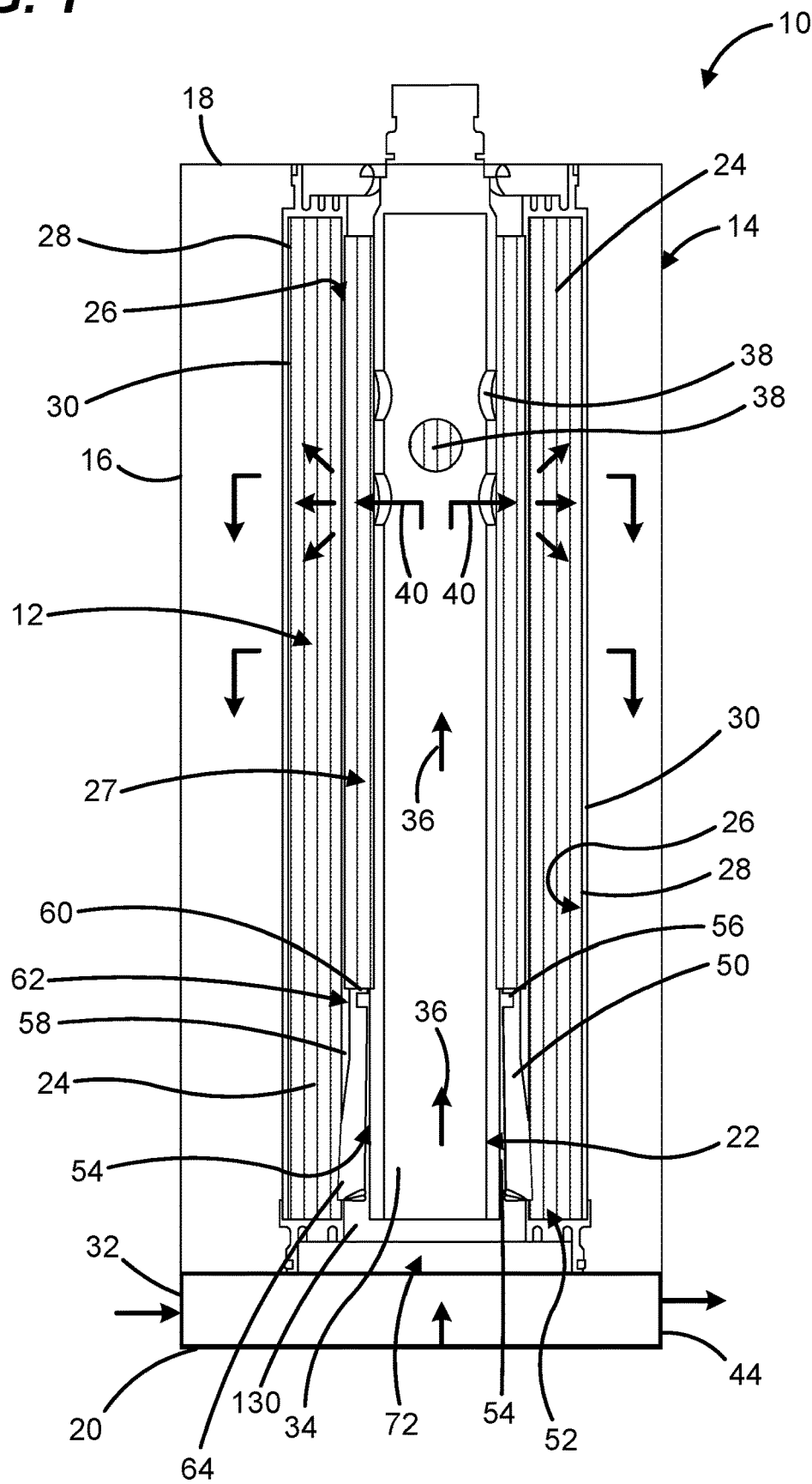
FIG. 1 is a sectional view of a filter assembly sectioned along a longitudinal midline of the assembly.

For the purposes of promoting an understanding of the principles of the invention, reference will now be made to the embodiments illustrated in the drawings where specific language is used to describe the same. It should be understood that no limitation of the scope of the invention is thereby intended. Any alterations and further modifications in the described embodiments, and any further applications of the principles of the invention as described herein are contemplated as would normally occur to one skilled in the art to which the invention relates.

FIG. 1 illustrates a filter assembly 10 including a filter cartridge 12 located within a filter housing 14. The filter cartridge 12, in different embodiments, is a disposable cartridge or a reusable cartridge, if cleaned after use. The filter housing 14 includes an external wall 16 having a top 18 and a bottom 20. The filter housing 14 further includes a centrally located flow pipe 22, extending from the bottom 20 of the housing 14. A filter element 24 of the filter cartridge 12 includes an interior wall 26 defining a volume or space 27 to receive the pipe 22. An exterior wall 28 of the filter element 24 is disposed adjacently to a metal container 30 which is formed as a part of the filter housing 14.

The filter housing 14 is configured to mechanically remove particulate contamination from hydraulic fluids, including removal from hydraulic oils used in connection with certain mining processes. Filtering of fluids other than oils is also contemplated. As can be seen in FIG. 1, a fluid to be cleaned is directed into the housing 14 at an inlet or input 32 and moves through a channel 34 of the pipe 22. The fluid moves upwardly through the pipe 22 in the direction of arrows 36. Once the fluid reaches a predetermined height, the fluid flows into and through a plurality of apertures 38 in the direction of arrows 40. The fluid continues to flow from the apertures 38 and through the filter element 24, where the residuals are removed by the cleaning action of the filter element 24.

The metal container 30 is formed of an apertured or a mesh material having a sufficiently rigid structure to contain the filter element 24, and to permit the moving fluid to through the filter element 24 and the metal container 30. The filtered fluid moves through the metal container 30 outwardly from the pipe 34 and into a cavity formed by an outer wall of the filter housing 14 and the metal container 30. The filtered fluid moves along the interior space of the cavity to an outlet or output 44. Once filtered, the cleaned fluid is returned to a system for further use.

Once a filter cartridge 12 has reached an end of its useful life, it is replaced with a new filter cartridge 12. The used filter cartridge 12 is removed from the filter housing 14 by removing a cap (not shown) typically located at the top 18 of the housing 14. Once the cap is removed, the filter cartridge 12 is pulled away from the bottom 20 of the housing 14 and through an opening previously covered by the housing cap. After removal, the space 27 of a new filter cartridge 12 is aligned with the pipe 34. The filter cartridge 12 is moved toward the bottom 20 of the filter housing 14 until properly seated.

The filter cartridge 12 includes a filter container arrangement 50 which is located toward an end 52 of the filter element 24. The container arrangement 50 is located within the space 27 and fixedly connected to the interior wall 26 of the filter element 24. The filter cartridge 12 includes the filter element 24 and the container arrangement 50 as a unitary part having a plurality of pieces coupled together.

Figure 2:
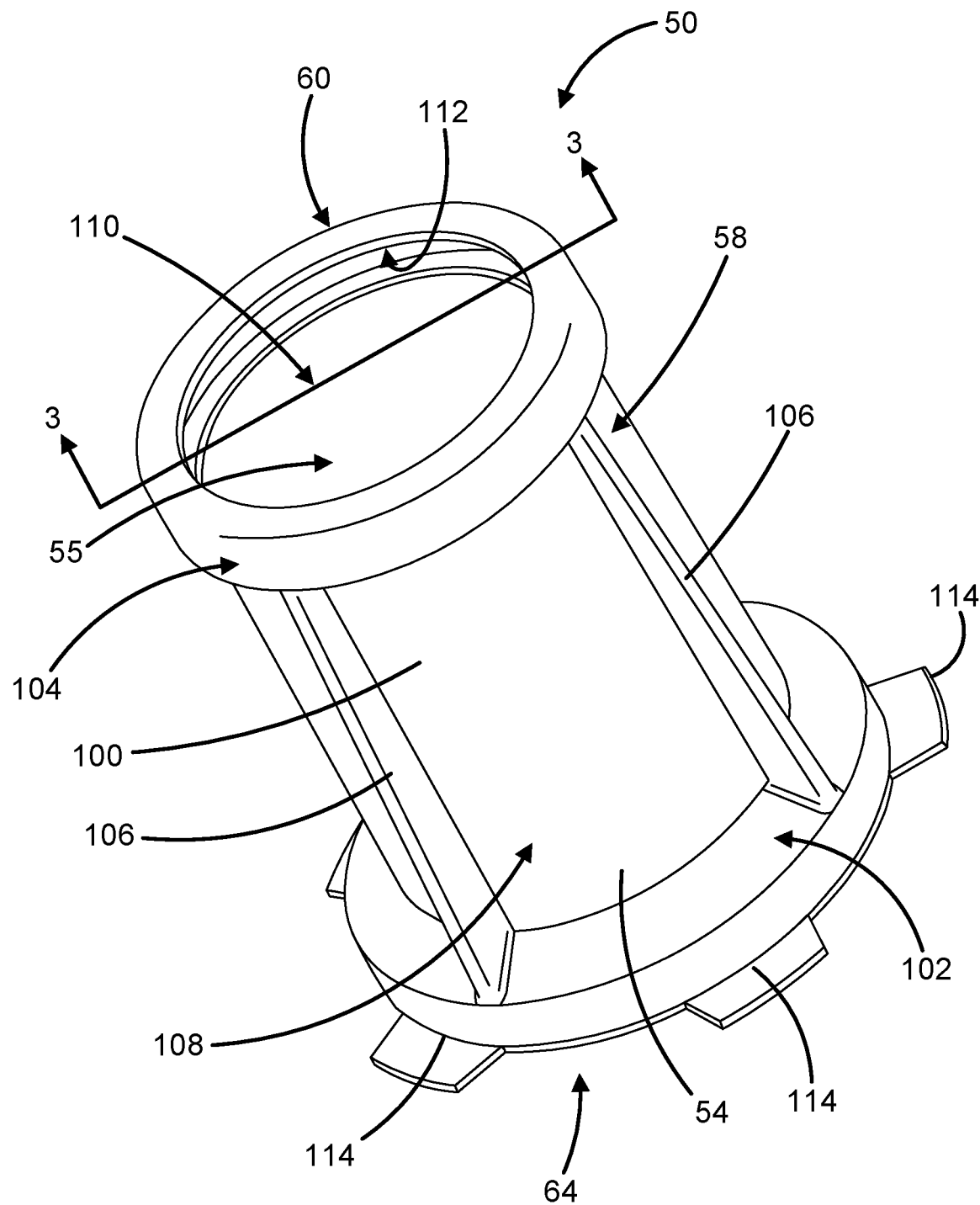
FIG. 2 is a perspective view of a container arrangement of the filter cartridge used in the filter assembly of FIG. 1.
Figure 3:
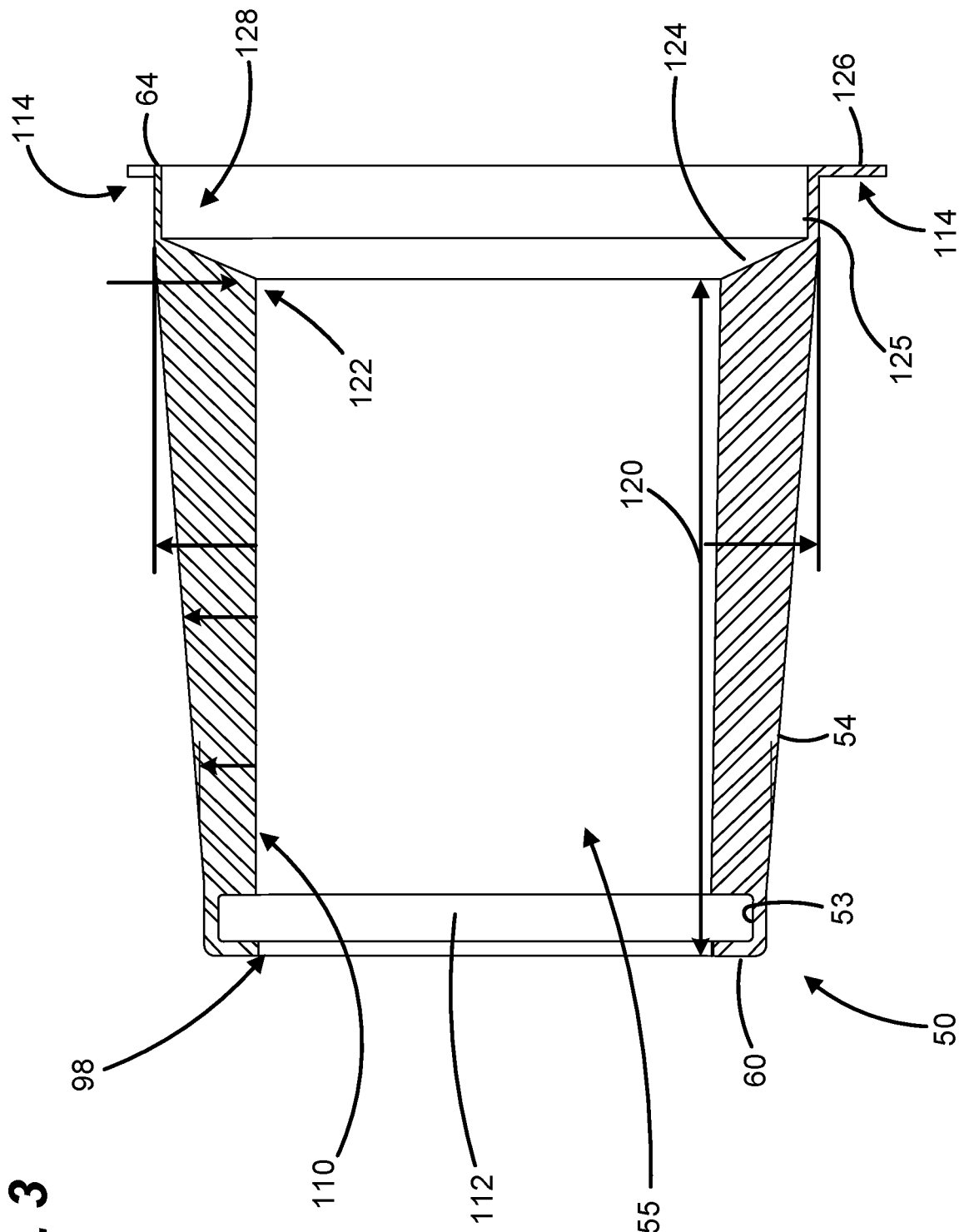
FIG. 3 is a sectional view of the container arrangement of FIG. 2 along a line 3-3.

The container arrangement 50, in one embodiment and in reference to FIGS. 2 and 3, is cylindrically shaped and includes an interior sidewall 54 defining a channel 55, which extends along the entire length of the container arrangement 50. The channel is configured to receive the pipe 22, such that container arrangement 50 is moveable along the longitudinal axis of the pipe 22, during insertion and removal of the filter cartridge 12. In one embodiment, a separate pipe gasket 56 is located in a slot or interior groove 53 (FIG. 3, which depicts the groove 53 without the pipe gasket 56 positioned therein) of the container arrangement 50 to provide a substantially fluid tight seal between the container arrangement 50 and the pipe 22. In one embodiment, the pipe gasket 56 is an O-ring gasket.

The container arrangement 50 includes an exterior wall 58, which in one embodiment, is conically shaped. At a first end 60 of the container arrangement 50, a volume or space 62 is defined between the exterior wall 58 of the container arrangement 50 and the interior wall 26 of the filter element 24. At a second end 64 of the container arrangement 50, the exterior wall 58 of the container arrangement 50 contacts the interior wall 26 of the filter element 24.

In use, fluid flowing through the pipe 22 includes impurities or contaminants which are filtered by and which remain in the filter element 24. Other contaminants, however, fall toward the bottom 20 of the filter assembly 10, where the contaminants remain until the spent filter cartridge 12 is replaced. The contaminants are collected in the volume or space 62 between the exterior wall 58 of the container arrangement 50 and the interior wall 26 of the filter element 26. The residuals in the space 66 collect over a period of time, such that any fluid flow is insufficient to move the collected contaminant through the filter element 24.

Once the filtering capability of the filter cartridge 12 is sufficiently reduced due to the capture of contaminants, the filter cartridge 12 is removed from the housing 16. Since the container arrangement 50 is connected to the filter element 24, any contaminants which remain in the space 27 are moved with the filter cartridge 12 as the filter cartridge 12 is moved upwardly through the open top 18. Since the combination of the container arrangement 50 and the filter element 24 form an essentially fluid tight seal at an interface at the second end 64 between the container arrangement 50 and the filter element 24, contaminants are removed. Due to this fluid tight seal, substantially all of the contaminants remain with the filter cartridge 12, such that substantially none of the contaminants are left at a base 72, which supports the pipe 22. As the contaminants are moved upwardly along the pipe 22 with removal of the filter cartridge 12, some of the contaminants are moved into the apertures 38, where such contaminants are filtered from the fluid, as the fluid moves through the channel 34 of the pipe 22. Other contaminants, which do not move into the apertures 38, are removed with the removal of the filter cartridge 12.

Again in reference to FIG. 1, the filter cartridge 12 includes a cartridge seal member 78. The seal member 78 is around an outer periphery of the cartridge end cap 79, and it forms a flexible seal between the cartridge 12 and an interior surface of the housing 14. FIG. 1 is a schematic view of the housing 14, so the interior surface of the housing 14 that forms a seal with the cartridge seal member 78 is not illustrated.

FIG. 2 illustrates a perspective view of the container arrangement 50. The wall 58 includes an outer surface 100 which extends from a base 102 to a shoulder 104. Extending between the base 102 and the shoulder 104 are a plurality radially aligned ribs 106.

An outer edge of the ribs 106 defines a decreasing outer profile from the base 96 to the shoulder 104. Between adjacent ribs 106, a chamber 108 is formed which also is defined by the base 102 and the shoulder 104.

The channel 55 includes an inner wall 110. The interior slot or groove 53 is located in the container arrangement 50 to locate the pipe gasket 56 (FIG. 1) In one embodiment, the inner wall 110 defines a constant inner profile from the first end 60 of to the second end 64 of the channel 55. In another embodiment, the inner wall 110 defines a decreasing inner profile from the first end 60 toward the second end 64 of the channel 55. The container arrangement 50 also includes a plurality of tabs 114 which extend from the base 102 in a direction substantially perpendicular to a longitudinal axis defined by the channel 55. In one embodiment, each of the tabs 114 is fixedly coupled to an end of the filter element 24, such that when the filter cartridge 12 is removed from the assembly, the container arrangement 50 is pulled upward. In example embodiments, the tabs 114 are molded into the end cap 79 of the filter cartridge 12.

As the filter element 22 moves in an upward direction through the open top 18, contaminants and other unwanted materials are collected in the chambers 108 between the ribs 106, the base 102 and the shoulder 104.

FIG. 3 illustrates a sectional view of FIG. 2 along lines 3-3. As seen in FIG. 3, the inner wall 110, defined by the channel 55, is generally cylindrical along a length 120, which is configured to define a circumference slightly larger than the flow pipe 22. The groove 53 is configured to hold pipe gasket 56 which provides a substantially fluid tight seal around the flow pipe 22. As the filter cartridge 12 is moved upward through the open top 18, contaminants move upwardly along the flow pipe 22, where such contaminants are either removed with the cartridge 12 or fall into the apertures 38. In the illustrated embodiment, the circumference of the channel 55 at the second end 60 is slightly smaller than at the first end 64. In this embodiment, the changing circumference of the channel 55 enables the filter cartridge 12 to be removed with less force from the flow pipe 22, than if the channel 55 included the same circumference from the second end 60 to the end 64. In other embodiments, however, the channel 55 defines a constant circumference from the second end 60 to the end 64.

The container arrangement 50 further includes a circumferential angled surface 124. The surface 124 extends from the end 64 to the tabs 114. A cylindrical portion 125 is located between the angled surface 124 and the tabs 114, wherein the tabs 114 extends substantially perpendicular to the longitudinal axis of the container arrangement 50. A second channel 128 is defined by the cylindrical portion 125, which includes a circumference sized to circumscribe a portion 130 of the base 72, as seen in FIG. 1.

The above is a description of principles of this disclosure. Many embodiments can be made using these principles.

What is claimed is:

1. A removable filter assembly for filtering a fluid having a particulate or a contaminant and configured to engage a filter housing having a center post, the removable filter assembly comprising:
   a filter element adapted to remove at least one of the particulate or contaminate from the fluid, wherein the filter element includes an interior wall defining a passage having a first end and a second end; and
   a container arrangement including a channel and a non-porous outer wall in contact with the filter element at the first end of the passage; the container arrangement adapted to capture at least one of the particulate or contaminate from the fluid;
   wherein the outer wall includes a plurality of ribs;
   wherein the container arrangement defines a base located at a first end and a shoulder located at a second end, each of the ribs extending from the base to the shoulder; and the shoulder defines an interior slot configured to retain a gasket to provide the fluid tight seal with the center post.

2. The removable filter assembly of claim 1 wherein the outer wall defines an outer profile extending from the first end of the passage toward the second end of the passage, the channel defining an inner wall configured to provide a fluid tight seal with the center post.

3. The removable filter assembly of claim 1 wherein the ribs are radially aligned.

4. The removable filter assembly of claim 1 wherein each of the ribs includes an edge defining the outer profile.

5. The removable filter assembly of claim 2 wherein the outer profile decreases from the first end toward the second end.

6. The removable filter assembly of claim 1 wherein the outer wall defines a chamber.

7. The removable filter assembly of claim 6, wherein the outer wall includes a plurality of ribs and the chamber is between each of the ribs.

\* \* \* \* \*